(12) United States Patent
Oehler (10) Patent No.: US 8,310,395 B2
(45) Date of Patent: Nov. 13, 2012

(54) METHOD OF AMENDING NAVIGATION DATA OF A GLOBAL NAVIGATION SYSTEM

(75) Inventor: Veit Oehler, Neubiberg (DE)

(73) Assignee: Astrium GmbH, Taufkirchen (DE)

( * ) Notice: Subject to any disclaimer, the term of this patent is extended or adjusted under 35 U.S.C. 154(b) by 239 days.

(21) Appl. No.: 12/817,831

(22) Filed: Jun. 17, 2010

(65) Prior Publication Data

US 2011/0037651 A1    Feb. 17, 2011

(30) Foreign Application Priority Data

Jun. 19, 2009 (EP) .................................... 09008053

(51) Int. Cl.
*G01S 19/02* (2010.01)
*G01S 19/08* (2010.01)
*G01S 19/20* (2010.01)

(52) U.S. Cl. ........ 342/357.395; 342/357.45; 342/357.58

(58) Field of Classification Search ............ 342/357.395, 342/357.45, 357.58
See application file for complete search history.

(56) References Cited

U.S. PATENT DOCUMENTS

| | | | | |
|---|---|---|---|---|
| 6,667,713 | B2 * | 12/2003 | Green et al. | 342/357.31 |
| 8,138,971 | B2 * | 3/2012 | Oehler | 342/357.395 |
| 2010/0265132 | A1 * | 10/2010 | Oehler | 342/357.58 |

OTHER PUBLICATIONS

Riley, W.J., "Algorithms for frequency jump detection", Metrologia 45, Dec. 5, 2008.*

J Hahn et al., "GIOVE-A Apparent Clock Assessment and Results", 39th Annual Precise Time and Time Interval (PTTI) Meeting, Nov. 29, 2007, pp. 95-114, XP002557647, Long Beach, U.S.A.
A Mozo Garcia et al, "GIOVE Orbit and Clock Determination and Prediction: Experimentation Results", European Navigation Conference (ENC), Apr. 25, 2008, pp. 1-11, XP002557648, Toulouse, France.
I. Hidalgo et al., "E-OSPF Experimentation Results in the Frame of the GIOVE-M Core Infrastructure", European Navigation Conference, ENC-GNSS, May 6, 2009, pp. 1-12, XP002557649, Naples, Italy.
J. R. Martin et al., "Galileo Orbitography and Synchronization Processing Facility (OSPF): Preliminary Design", ION GNSS 19th International Technical Meeting of the Satellite Division, Sep. 29, 2006, XP002557650, Fort Worth, U.S.A.
European Search Report dated Dec. 4, 2009 (Seven (7) pages).

* cited by examiner

*Primary Examiner* — Jack W Keith
*Assistant Examiner* — Cassie Galt
(74) *Attorney, Agent, or Firm* — Crowell & Moring LLP (57) ABSTRACT

For amending navigation data of a global navigation system, navigation signals are received from a space vehicle, and a predicted clock phase offset of the clock signal sent from the space vehicle is estimated and stored in a memory. The clock phase offset difference between the current estimated clock phase offset and a previously estimated clock phase offset times ($T_1$) is then computed and stored. An earlier computed phase offset difference between a previously estimated clock phase offset and a further previous estimation for said clock phase offset is obtained, wherein the time interval between the current measurement epoch and second earlier epoch is at least $T_1$. The difference between the computed clock phase offset differences is derived, and compared with a given threshold value. If the latter difference is greater than the given threshold value, an integrity risk signal is generated and transmitted to other devices for position determination.

6 Claims, 5 Drawing Sheets

METHOD OF AMENDING NAVIGATION DATA OF A GLOBAL NAVIGATION SYSTEM

This application claims the priority of European patent document 09 008 053.2-1248, filed Jun. 19, 2009, the disclosure of which is expressly incorporated by reference herein.

FIELD OF THE INVENTION

The invention relates to a method of amending navigation data of a global navigation system, in particular a method on how to detect clock frequency jumps onboard a navigation satellite in order to reduce the impact on the navigation and integrity service. The invention is further directed to a related navigation system.

BACKGROUND OF THE INVENTION

Satellite navigation systems rely in general on very stable satellite clock performances to allow accurate satellite clock behavior prediction, which is required to model accurately the satellite clocks at user level through the provided satellite clock model parameters.

Unpredictable events like contingent and sudden changes or jumps in the satellite clock frequency cannot be measured immediately by the ground monitoring segment, which is provides the satellite clock model parameters to the user, and therefore such events cannot be properly modeled by the user and impose an additional error due to the inaccurate satellite clock modeling accordingly.

Satellite navigation systems like GPS or the future European Galileo system currently use satellite frequency standards, i.e., satellite clocks, based on Rubidium technology that shows such unpredictable clock frequency jump behavior.

For Galileo, based on early test satellite measurement results with the experimentation satellites GIOVE-A and GIOVE-B, typical Rubidium clock (called RAFS) jumps occur up to 1-2 times per month with a frequency jump magnitude that might degrade the ranging accuracy by up to around 1 m to 10 m. This has a non negligible impact on the positioning service, and a major and significant impact on the future Galileo integrity service performance that is even jeopardizing the feasibility of those Galileo services.

Especially for integrity purposes where the user needs to know a priori the signal and related ranging quality with very high confidence, such unpredictable events must either be avoided, or immediately detected, in order to allow for user recovery actions, like removal of the affected satellite navigation signals from the data used for position detection.

Avoidance of the effect could be achieved by considering different satellite clock technologies, like passive hydrogen masers (PHM) as currently foreseen for the Galileo system in co-existence with RAFS onboard each satellite.

Detection of such events could be typically done at ground monitoring segment level, where each satellite is permanently tracked by several monitoring stations (up to 40 stations for Galileo).

Galileo integrity services can be secured only if one of the above mechanisms is implemented (i.e., avoidance or detection together with related recovery).

SUMMARY OF THE INVENTION

One object underlying the present invention is to ensure feasible Galileo integrity services that might otherwise be jeopardized in the presence of space vehicle navigation signal anomalies, such as satellite clock frequency jumps, by detecting signal anomalies at ground monitoring level.

This and other objects and advantages are achieved by the method of amending navigation data of a global navigation system according to the invention, in which the impact of space vehicle navigation data anomalies, like clock frequency jumps, on the device for position detection is reduced by the steps of:

1a) receiving navigation signals from a space vehicle;

1b) estimating a prediction of the clock phase offset of the clock signal sent from the space vehicle, and storing this prediction in a memory;

1c) computing at the current measurement and monitoring epoch ($t_0$) the clock phase offset difference $\alpha$ between the current estimated clock phase offset obtained in step 1b) and a previous estimation for said clock phase offset of a first earlier epoch ($t_{-1}$) with a given time interval ($T_1$) and storing the difference $\alpha$ in a memory;

1d) obtaining an earlier computed phase offset difference $\alpha$ from the memory wherein said earlier computed phase offset difference $\alpha$ was computed and stored at a second earlier epoch ($t_{-2}$) according to step 1c) between a previous estimation for said clock phase offset of said second earlier epoch ($t_{-2}$) and a further previous estimation for said clock phase offset of a third earlier epoch ($t_{-3}$) with the given time interval ($T_1$), wherein the time interval ($T_2$) between the current measurement and monitoring epoch ($t_0$) and said second earlier epoch ($t_{-2}$) is equal to or greater than $T_1$;

1e) deriving the difference ($\Delta_0$) between the clock phase offset difference $\alpha$ computed in step 1c) and the earlier computed phase offset difference $\alpha$ 1f) comparing the difference ($\Delta_0$) derived in step 1e) with a given threshold value (TH);

1g) generating an integrity risk signal if the difference ($\Delta_0$) derived in step 1e) is greater than the given threshold value (TH); and 1h) transmitting the integrity risk signal to other devices for position detection of the global navigation system.

Ground segment satellite signal tracking, data analysis and comparing with a dedicated barrier or threshold according to the invention indicates abnormal satellite behavior.

The present invention uses the permanent satellite tracking and monitoring function of the ground segment in such a way, that even smaller changes in the nominal satellite clock behavior, as it would appear from onboard clock frequency jumps, can be detected, and the user can be informed accordingly.

Especially for Galileo, various detection mechanisms are already implemented in the ground segment but currently none of them is sensitive enough for satellite clock frequency jumps, to limit the impact on Galileo's services to a minor or even no service performance degradation.

The invention proposes a new type of barrier that compares within the ground segment monitoring functions, the current satellite clock predictions with previous results from two different epochs, and checks whether the difference between those two comparisons (also as difference between current and old result) exceeds a certain threshold.

In practice, such a threshold needs to be determined, based on real measurements from the final Galileo satellites, in a trade-off between detection capability and false-alert rate. Once such threshold is selected (which could even be derived and maintained per satellite), a triggered event can be used to raise an alarm and the user will remove the navigation signals of this satellite from the positioning and integrity risk calculation solution. Such threshold information could also be transmitted to the user via the signal, to allow user specific recovery actions according to the user's mission needs.

Preferably the time intervals ($T_1$) and ($T_2$) are set in a range between 1.5 hours to 2.5 hours, preferably to a value of 2 hours, and threshold value (TH) is set in a range between $2.5 \cdot e^{-9}$ to $5 \cdot e^{-9}$, preferably to $4.7 \cdot e^{-9}$.

It is also preferable that steps 1a) to 1h) be carried out by a ground mission segment of the global navigation system, and that the integrity risk signal be sent to end user devices for consideration within the integrity and navigation algorithms in the devices for position detection.

The global navigation system according to the invention comprises a plurality of space vehicles transmitting information to at least one device for position detection, wherein each space vehicle comprises at least one clock; and a ground mission segment (GMS) which carries out the method steps 1a) to 1h) of claim 1 and which transmits the integrity risk signal to end user devices for position detection.

In a preferred embodiment the GMS comprises an orbitographic and synchronization processing facility (OSPF) which carries out the method steps 1a) to 1g) of claim 1.

BRIEF DESCRIPTION OF THE DRAWINGS

The invention will now be described with reference to the drawings in which.

DETAILED DESCRIPTION OF PREFERRED EMBODIMENTS OF THE INVENTION

Using Rubidium clock technology in space missions for typical satellite navigation services (such as GPS or future Galileo satellite navigation systems) requires, for certain systems, adaptations to cope with the typical Rubidium-clock frequency jump behavior, as observed from GPS as well as early Galileo test satellite measurement campaigns.

Such system concept adaptations are necessary, since the clock frequency jumps cannot be predicted, and therefore impose additional ranging errors at service user level on the order of one to even above ten meters with significant impact on the provided service performance.

Especially from an integrity service point of view such behavior is considered most critical, since the system must ensure a certain ranging quality a priori with very high confidence, and provides the related integrity information to the user accordingly. If such integrity information, called the signal-in-space accuracy (SISA), which is an overbound of the currently worst possible signal quality/ranging performance, must also cover the additional errors that could be imposed by clock frequency jumps, this would result in a major degradation of SISA upper bound performance, with major consequences for the integrity service accordingly.

Therefore the effects of satellite clock frequency jumps need to be either avoided, which could be done e.g., with passive hydrogen maser (PHM) clock technology, or the possible impact of a jumping Rubidium-clock (called RAFS) needs to be limited to a minor impact on the final integrity service performance (e.g., by detection at ground monitoring level and related alert sent to the user to not consider the affected navigation signal).

The present invention as described in this example proposes a new method for detecting such a change in satellite frequency behavior accordingly, to limit the impact of satellite clock frequency jumps on the Galileo services.

The following sections therefore describe the typical Rubidium-clock frequency jump characteristics, a new barrier to detect satellite clock frequency jumps, analysis of the expected performance of such new barrier, analytical as well as based on real data, and how such a detection mechanism can be used within the Galileo system to mitigate the impact on the integrity services.

Typical Satellite Rubidium-Clock Frequency Jump Behavior

From time to time, satellite frequency standards used in satellite navigation systems, like GPS, typically change their typical frequency behavior, (also called frequency jump) over short periods.

Such behavior can be directly measured on the ground, and is illustrated in FIG. 1 for some of the GPS satellites that are currently transmitting with Rubidium technology based onboard frequency standards. The horizontal axes of the graphs in FIG. 1 indicate the clock life in days and the respective vertical axes indicate the frequency of the satellite clock.

Figure 1A:
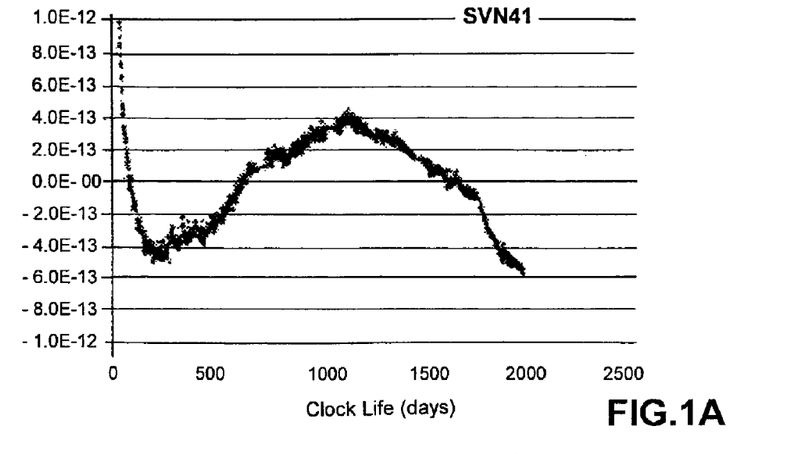
FIGS. 1A-1F show GPS Rubidium-clock frequency measurements.
Figure 1B:
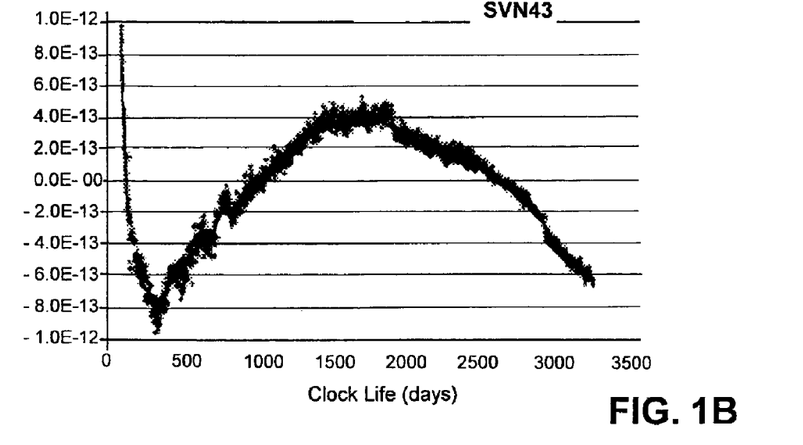
Figure 1C:
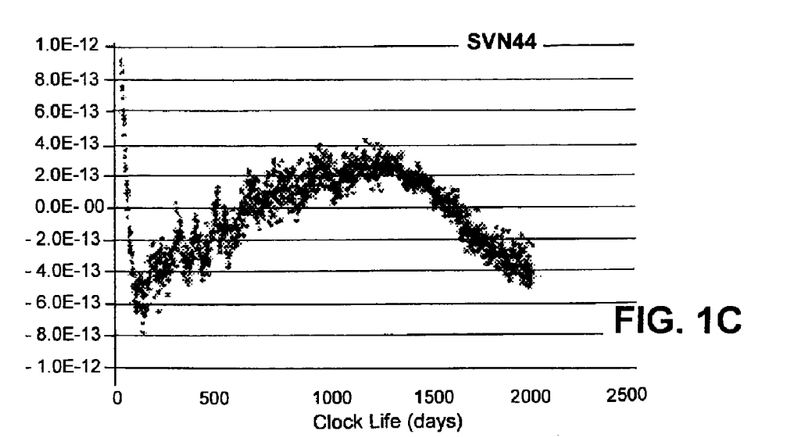
Figure 1D:
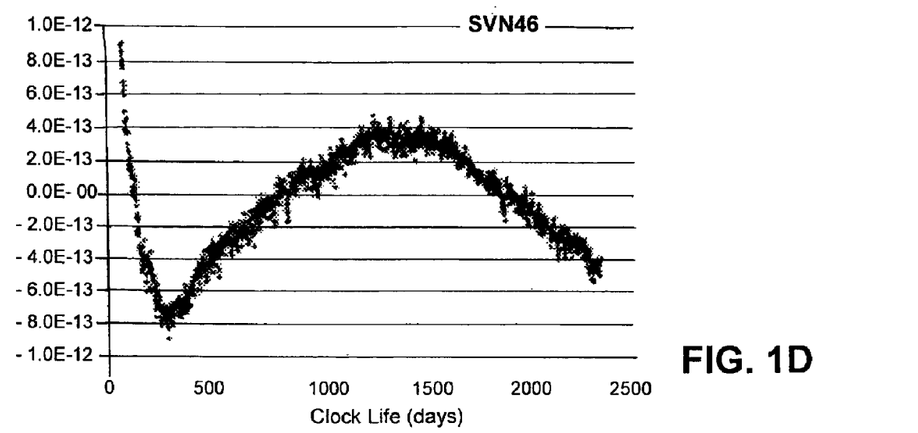
Figure 1E:
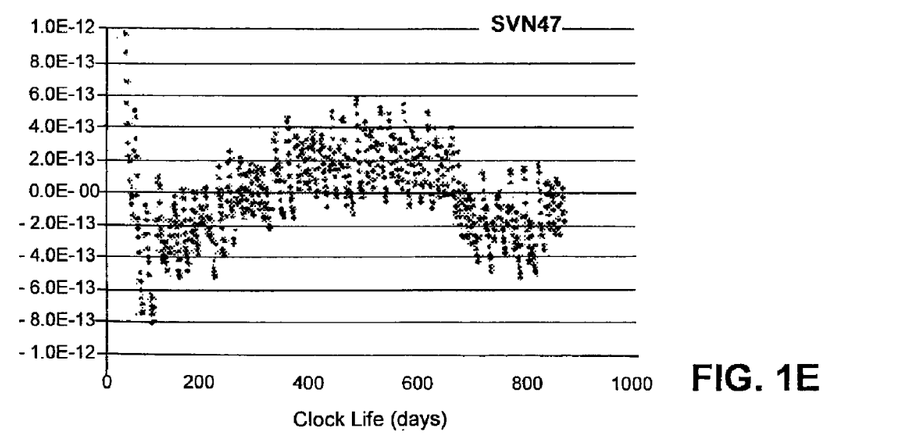
Figure 1F:
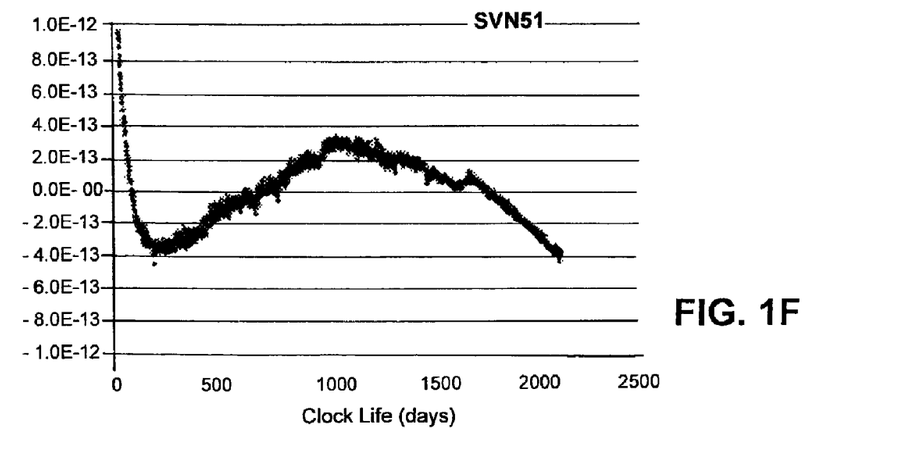
Figure 2:
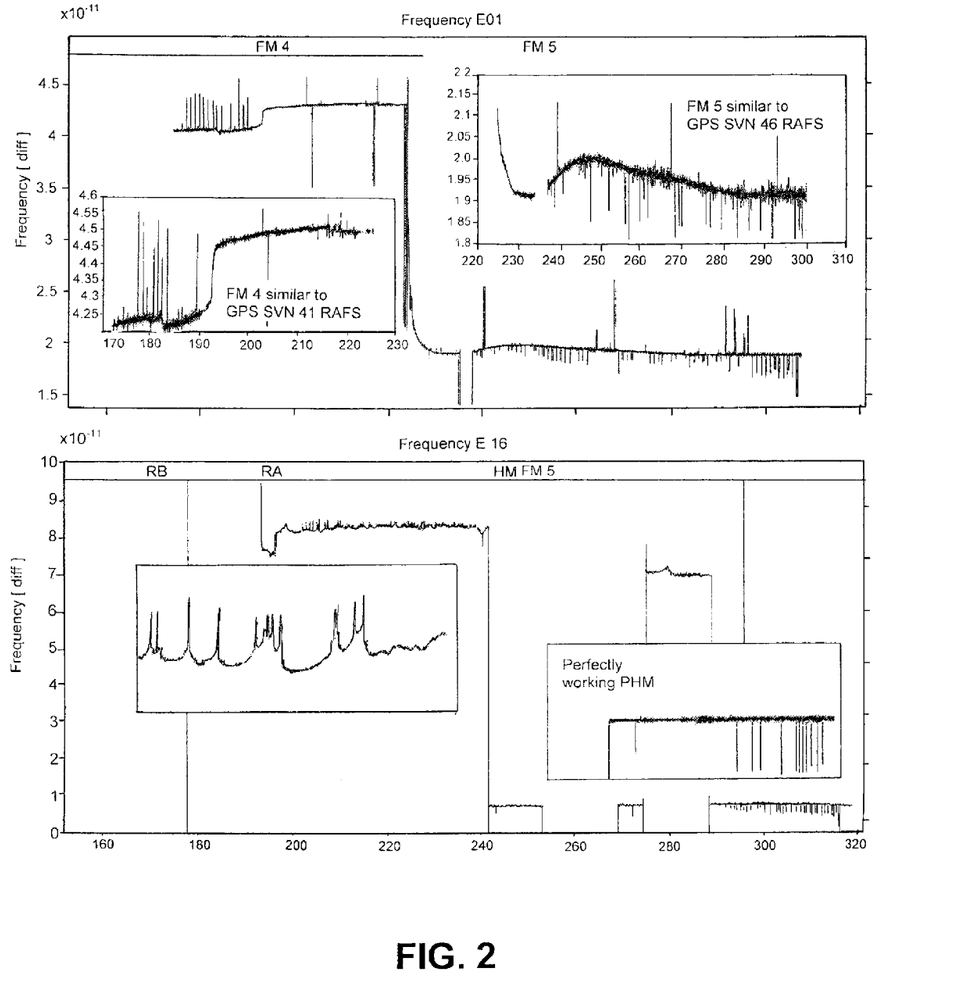
FIG. 2 shows GIOVE clock frequency measurements.

Similar behavior s are measured for the early Galileo test satellites, the GIOVE-A and GIOVE-B, as shown in FIG. 2 as satellite frequency behavior over time.

It can be seen that such a Rubidium clock jump characteristic needs to be considered as normal behavior, rather than a rare feared event, and needs to be treated and recovered in the nominal system design accordingly.

The lower right window in FIG. 2 even shows the perfectly working PHM clock technology without any jumps, which does not require for any system concept adaptations.

The New Ground Segment Detection Barrier of the Invention

The general idea concerning a ground mission segment (GMS) located detection mechanism is to provide a barrier for frequency jumps detection that can be implemented by minor changes in the GMS current design (i.e., with rather small adaptations to already available functionalities and mechanisms).

The new invented and adapted barrier will act in real time (or nearly real time) based on the clock estimated on ground, for which the relevant (and already available) GMS elements are the orbit determination and time synchronization processing facility (OSPF), and the mission support facility (MSF).

The OSPF typically produces a prediction of the satellites clocks every ten minutes by using the measured L-band signals for the estimation. A more accurate (but less frequent, e.g., once per day) estimate of the clock is provided by the MSF, that is in charge of providing the clock restitutions. For a near real-time barrier therefore the OSPF needs to be considered as most suitable for the new detection mechanism.

Figure 3:
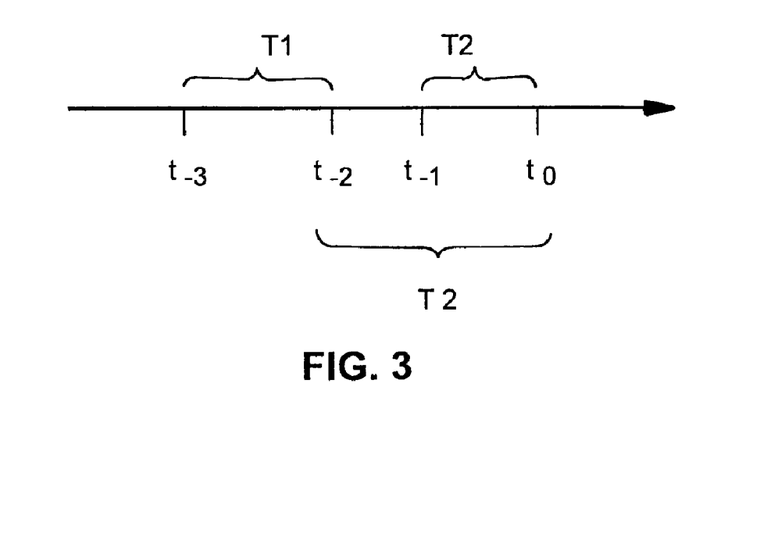
FIG. 3 is a time line indicating the monitoring epochs and the time intervals.

Considering the overall objective to propose an optimal barrier for satellite clock frequency jumps, with as few modifications to the current Galileo respectively GMS design as possible, and using already available elements and mechanisms, the new barrier is proposed to be set up in the following three steps with reference to FIG. 3.

1. Compute at the current measurement and monitoring epoch $t_o$ the difference $\alpha$ between the current estimated clock phase offset, and the previous estimate for that clock phase offset at an earlier epoch $t_{-1}$, with $t_{-1} < t_0$ (interval between $t_{-1}$ and $t_0 = T_1$).
2. Derive the difference $\Delta_0$ between the step 1 result (difference $\delta_0$) and the result (difference $\alpha$) for the same procedure (like in step 1) executed at a further earlier epoch $t_{-2}$, with $t_{-2} \leq t_{-1} < t_0$ and an equal interval $[t_0 - t_{-1}]$, wherein the interval between $t_{-2}$ and $t_0$ is $T_2$.
3. Check if the resulting absolute difference value $\Delta_0$ derived in step 2 is above a dedicated threshold (TH).

Within the first step (step 1) a smoothed frequency offset of the clock is generated, since the process is working directly over the estimated phase. This is in fact equivalent to computing the frequency offset as the phase derivative, and then using a smoothing window that is a running average of length with $[t_0 - t_{-1}]$.

The direct comparison of the magnitude of the difference after step 1 and step 2 against a dedicated threshold in step 3 is a straightforward and relatively easy process that nevertheless proves to be very efficient.

Adjusting the new barrier or threshold then needs to be made through the identification of the optimum values for the three described parameters $t_{-1}$, $t_{-2}$, and the threshold TH; that is, the value of the threshold is linked to the other two parameters.

Analysis and Performance of the New Detection Barrier

In order to study the feasibility of the above invented and described new detection barrier or threshold, detailed analyses have been conducted with both simulated and real data. As a first promising result to illustrate the efficiency of the invention, an appropriate tuning for the three parameters has led to the values $$|t_0 - t_{-1}| = T_1 = 2h$$

$$|t_0 - t_{-2}| = T_2 = 2h = T_1$$

$$TH = 4.7 \cdot e^{-9}$$

As an example for the measurement and monitoring epoch at a given day at 18:00 with above set of parameters, the new barrier would check and work as follows (with $\Phi_{offset}$... as the carrier phase offset estimation function).

$$|[\Phi_{offset}(18:00) - \Phi_{offset}(16:00)] - [\Phi_{offset}(16:00) - \Phi_{offset}(14:00)]| \stackrel{?}{\leq} TH$$

If this condition is not met, the barrier triggers a detection event accordingly.

Real Data Analysis (Example)

in order to analyze and demonstrate the detection capability and performance of the new barrier with real data, real phase clock estimations from the GIOVE satellites have been processed.

Figure 4:
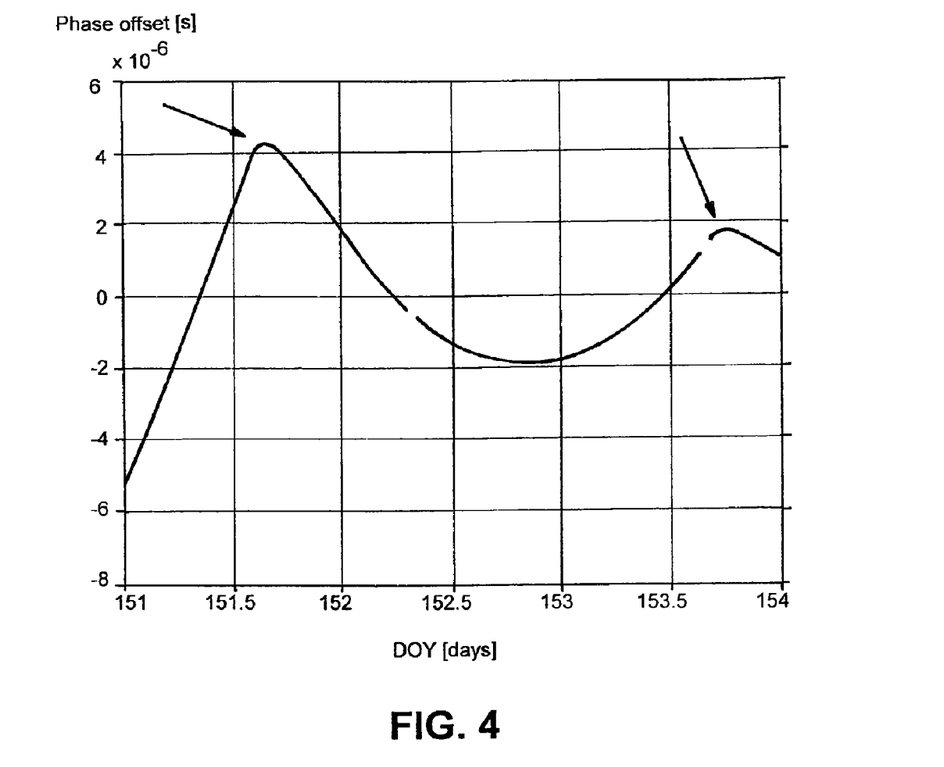
FIG. 4 shows an estimated GIOVE clock phase.

FIG. 4 shows the clock phase evolution of a typical GIOVE measurement interval, where two clock jumps occurred between day of year (DOY) 151.6 and 151.8 with an absolute magnitude of $3 \cdot e^{-12}$, and between 153.6 and 153.9 with $1.5 \cdot e^{-12}$.

The two frequency jumps or fast changes, respectively, are clearly visible around the given days.

Figure 5:
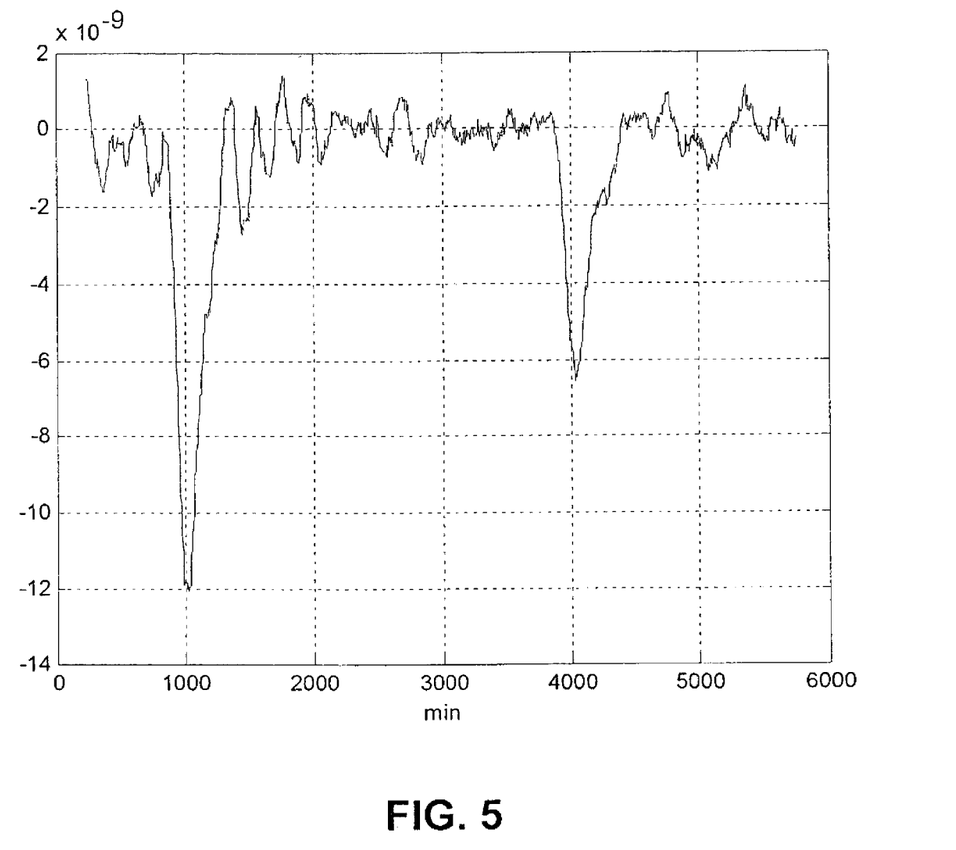
FIG. 5 shows new barrier real-time detection measurements carried out with the method of the present invention.

Applying the described barrier with the selected parameters would have generated in real time or near real time, respectively, the results shown in FIG. 5.

With the detection threshold TH set to $4.7 \cdot e^{-9}$ the first jump would have been detected at 930 min, and the second jump at 3975 min. The first jump would have imposed a maximum worst-case prediction error at user level of around 1.7 m, and the second jump an error of around 1.3 m.

Applying the above described procedure over longer periods, and many kinds of satellite clock frequency jumps, it can be shown that a maximum prediction of around 1.7 m is considered the maximum error that cannot been detected by the new barrier. As soon as such value is exceeded, the barrier detects the jump respectively the imposed range error.

Such a detection value depends on the finally selected set of parameters, which needs to be optimized according to the typical RAFS jump characteristics.

The following table shows the detection performance over longer measurement cycles for different barrier setups.

| Day of Jump | Duration [min] | Amplitude [s/s] | Barrier 1: T1 = T2 = 2 h, TH = 4.7e−9 | Barrier 2: T1 = T2 = 1.5 h, TH = 2.7e−9 |
|---|---|---|---|---|
| 30 Mar. 2008 | 875 | 4.90E−12 | D/1.1 m | D/0.8 m |
| 01 Apr. 2008 | 5 | −3.60E−12 | D/1.5 m | D/1.0 m |
| 05 Apr. 2008 | 575 | 2.40E−12 | D/1.2 m | D/0.8 m |
| 09 Apr. 2008 | 145 | −6.00E−13 | ND/<1.7 m | D/1.1 m |
| 14 Apr. 2008 | 290 | −1.10E−12 | ND/<1.7 m | D/1.4 m |
| 17 Apr. 2008 | 135 | 7.00E−13 | ND/<1.7 m | ND/<1.7 m |
| 26 Apr. 2008 | 720 | 1.50E−12 | ND/<1.7 m | ND/<1.7 m |
| 04 May 2008 | 260 | 5.00E−13 | ND/<1.7 m | D/1.0 m |
| 10 May 2008 | 305 | 6.00E−13 | ND/<1.7 m | ND/<1.7 m |
| 30 May 2008 | 290 | −3.00E−12 | D/1.7 m | D/1.2 m |
| 01 Jun. 2008 | 430 | 1.50E−12 | D/1.3 m | D/0.7 m |

It can be seen that the jumps are either detected (D) with maximum value of 1.7 m (and possibly better performance with a different barrier setup), or the jump has not been detected (ND) with imposed range error below 1.7 m.

From such a table it can be seen, with proper and further barrier setup optimization, that typical jump magnitudes of around $5 \cdot e^{-13}$ s/s could be detected with high probability.

Such a detection capability is far better (by an order of magnitude) than the currently reported GMS detection capability based on currently implemented barriers of around $3 \cdot e^{-12}$ s/s, i.e., the invention would dramatically improve the GMS detection performance.

System Consideration of the New Barrier Detection Performance

Once properly assessed and finally tuned, the minimum frequency jump value that is just not been detected, and that would impose a significant error at user level, (i.e., above around 1.7 m), could be considered as worst case jump magnitude and related user error, to inflate a-priori the integrity information SISA. Such permanent inflation would affect the integrity service availability, but would properly ensure a Galileo service with integrity.

Detected jumps would of course raise an alert that is sent to the user within the required Time-to-Alert (TTA), and the related satellite would be immediately removed from the navigation solution at user level.

Due to the different RAFS behavior s with respect to their jump characteristics (where some RAFS might jump frequently with large magnitudes, while others might not jump at all), the GMS barrier setup with related minimum not detected jump magnitude could be optimized per satellite, and such information (i.e., minimum jump magnitude) could be transmitted within the navigation message (if inflation is to be performed directly at user level). With such an approach, not all RAFS integrity information (SISA) would need to be inflated according to the worst RASF impact, but only as required for that specific satellite (for some RAFS, not at all). This would further improve the integrity service availability, still ensuring a service with integrity.

Furthermore, the SISA integrity information inflation, that can be directly derived from the overbounding concept as given in the applicable Galileo System Requirements Document, imposes a significant SISA increase already for rather small biases of up to 1 m to 2 m (i.e., also for the improved new barrier). Such large increase could be further reduced by the consideration of the user impact probability. This means that an integrity event (or non-integrity event, i.e., hazardous misleading information, HMI) occurs only when the user is actually put in danger (i.e., that its positioning solution exceeds the required and specified accuracy targets for its operation, and the integrity algorithm did not warn him to not start or to abort a critical operation). An increased integrity risk contribution coming from slightly improper SISA inflation would not lead to an HMI (i.e., to an integrity event), if the user's positioning solution would not exceed the accuracy targets. This is called the user impact probability.

The additional integrity risk coming from the improper SISA inflation could also be directly considered as a specific contribution to the allowed integrity risk at user level, (i.e., directly within the user equation or the Galileo integrity allocation tree). The final value including additional safety margin if required can be assessed, together with the final barrier detection performance, and could even depend on the user's operation.

The above-described concepts for considering and properly using the detection performance of the new barrier, reduce significantly the impact of satellite clock frequency jumps on the Galileo integrity services.

Furthermore the inflation of the integrity information SISA for above concepts could be done either at GMS or at user level, without major design changes. The inflation at GMS level would not even require the provision of related detection performance information to the user.

The invention provides a method for minimizing the impact of satellite clock frequency jumps on Galileo's integrity services, by implementing a new barrier at ground monitoring segment (GMS) level, and to properly consider the detection information either at GMS or at user level, including alert in case of detection.

Neither of the concepts of detection with a new barrier, nor the consideration of the related information requires any major design changes. The invented barrier uses already available products like phase offset estimations, combining and analyzing available information in a different and inventive way. Proper alert mechanisms in case of detection, as well as inflation capabilities are also already available and implemented at GMS level, and could also be easily implemented at user level if required.

With the described concepts the invention ensures feasible Galileo integrity services from an availability point of view, as well as the integrity of the data.

Reference numerals or characters in the claims, in the description and in the drawings are provided only for better understanding of the invention and do not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of amending navigation data of a global navigation system comprising a plurality of space vehicles that transmit information to at least one device for position detection; wherein:

each space vehicle has at least one clock; and the impact of space vehicle navigation data anomalies, including clock frequency jumps, on the at least one device for position detection is reduced by a ground mission segment performing the steps of 1a) receiving navigation signals from a space vehicle;

1b) estimating a prediction of a clock phase offset of a clock signal sent from the space vehicle, and storing this prediction in a memory;

1c) computing at a current measurement and monitoring epoch ($t_0$) a clock phase offset difference ($d_0$) between the estimated prediction of the clock phase offset obtained in step 1b) and a previous estimation for said clock phase offset of a first earlier epoch ($t_{-1}$) within a given time interval ($T_1$) and storing the clock phase offset difference ($d_0$) in a memory;

1d) obtaining an earlier computed phase offset difference ($d_{-1}$) from the memory wherein said earlier computed phase offset difference ($d_{-1}$) was computed and stored at a second earlier epoch ($t_{-2}$) according to step 1c) between a previous estimation for said clock phase offset of said second earlier epoch ($t_{-2}$) and a further previous estimation for said clock phase offset of a third earlier epoch ($t_{-3}$) within the given time interval ($T_1$), wherein a time interval ($T_2$) between the current measurement and monitoring epoch ($t_0$) and said second earlier epoch ($t_{-2}$) is equal to or greater than $T_1$;

1e) deriving a difference ($\Delta_0$) between the clock phase offset difference ($d_0$) computed in step 1c) and the earlier computed phase offset difference ($d_{-1}$);

1f) comparing the difference ($\Delta_0$) derived in step 1e) with a threshold value;

1g) generating an integrity risk signal if the difference ($\Delta_0$) derived in step 1e) is greater than the given threshold value; and 1h) transmitting the integrity risk signal to the at least one device for position detection of the global navigation system.

2. The method according to claim 1, wherein the time intervals ($T_1$) and ($T_2$) are set in a range between 1.5 hours to 2.5 hours.

3. The method according to claim 1, wherein the threshold value is set in a range between $2.5 \cdot e^{-9}$ to $5 \cdot e^{-9}$.

4. The method according to claim 1, wherein:

the integrity risk signal is sent to the at least one device for position detection for consideration within integrity and navigation algorithms in the at least one device for position detection.

5. A global navigation system comprising:

a plurality of space vehicles that transmit information to at least one device for position detection, each space vehicle comprising at least one clock; and a ground mission segment;

wherein the ground mission segment is configured to 5a) receive navigation signals from a space vehicle;

5b) estimate a prediction of a clock phase offset of a clock signal sent from the space vehicle, and storing this prediction in a memory;

5c) compute at a current measurement and monitoring epoch ($t_0$) a clock phase offset difference ($d_0$) between the estimated prediction of the clock phase offset obtained in step 5b) and a previous estimation for said clock phase offset of a first earlier epoch ($t_{-1}$) within a given time interval ($T_1$) and storing the difference ($d_0$) in a memory;

5d) obtain an earlier computed phase offset difference ($d_{-1}$) from the memory wherein said earlier computed phase offset difference ($d_{-1}$) was computed and stored at a second earlier epoch ($t_{-2}$) according to step 5c) between a previous estimation for said clock phase offset of said second earlier epoch ($t_{-2}$) and a further previous estimation for said clock phase offset of a third earlier epoch ($t_{-3}$) within the given time interval ($T_1$), wherein a time interval ($T_2$) between the current measurement and monitoring epoch ($t_0$) and said second earlier epoch ($t_{-2}$) is equal to or greater than $T_1$;

5e) derive a difference ($\Delta_0$) between the clock phase offset difference ($d_0$) computed in step 5c) and the earlier computed phase offset difference ($d_{-1}$);

5f) compare the difference ($\Delta_0$) derived in step 5e) with a given threshold value;

5g) generate an integrity risk signal if the difference ($\Delta_0$) derived in step 5e) is greater than the given threshold value; and 5h) transmit the integrity risk signal to the at least one device for position detection of the global navigation system.

6. The global navigation system as claimed in claim 5, wherein the ground mission segment comprises an orbitographic and synchronization processing facility which carries out the method steps 5a) to 5g).

* * * * *